United States Patent
Fujita

(10) Patent No.: US 6,704,575 B1
(45) Date of Patent: Mar. 9, 2004

(54) CORDLESS TELEPHONE SET AND REGISTRATION METHOD THEREFOR

(76) Inventor: Toshihiro Fujita, c/o Sony Corporation, 7-35 Kitashinagawa, 6-Chome, Shinagawa-ku, Tokyo (JP)

( * ) Notice: Subject to any disclaimer, the term of this patent is extended or adjusted under 35 U.S.C. 154(b) by 0 days.

(21) Appl. No.: 09/414,444

(22) Filed: Oct. 7, 1999

(30) Foreign Application Priority Data

Oct. 12, 1998 (JP) .......................................... P10-289277

(51) Int. Cl.⁷ ............................................. H04M 11/00
(52) U.S. Cl. ...................... 455/462; 455/463; 455/465; 455/464
(58) Field of Search .............................. 455/426.1, 462, 455/465, 74.1, 422.1, 464, 463, 450, 403, 550.1, 551; 379/142, 127

(56) References Cited

U.S. PATENT DOCUMENTS

| | | | | |
|---|---|---|---|---|
| 5,842,122 A | * | 11/1998 | Schellinger et al. | 455/403 |
| 5,854,983 A | * | 12/1998 | Goto et al. | 455/462 |
| 5,887,264 A | * | 3/1999 | Kohler | 455/461 |
| 6,167,285 A | * | 12/2000 | Howe | 455/552.1 |
| 6,314,287 B1 | * | 11/2001 | Leickel et al. | 455/426.1 |
| 6,314,299 B1 | * | 11/2001 | Schreib et al. | 455/465 |
| 6,363,246 B1 | * | 3/2002 | Williams et al. | 455/403 |
| 6,381,457 B1 | * | 4/2002 | Carlsson et al. | 455/435.2 |
| 6,381,462 B1 | * | 4/2002 | Charas | 455/452.2 |
| 6,526,279 B1 | * | 2/2003 | Dent | 455/437 |
| 6,529,738 B1 | * | 3/2003 | Forde et al. | 455/514 |
| 6,571,094 B1 | * | 5/2003 | Begeja et al. | 455/417 |

* cited by examiner

Primary Examiner—Pablo Tran

(57) ABSTRACT

A cordless telephone set includes a base unit and a terminal unit. The base unit, which has detected by a terminal-unit detecting circuit that the terminal unit is placed thereon, awaits an identification number of the terminal unit to be transmitted from the terminal unit. The base unit receives the identification number of the terminal unit via an antenna and a transmitting-receiving unit. A control unit determines whether the identification number of the terminal unit is on a terminal unit identification number list of terminal units having a relationship with the base unit, which is recorded in memory. If the determination result is negative, the identification number is added to the list, thus updating the terminal unit identification number list. Next, the base unit transmits its identification number to the terminal unit. Likewise, the terminal unit updates a base unit identification number list. Accordingly, the base unit identification number list and the terminal unit identification number list, which are indicative of a relationship between the base unit and the terminal unit, are updated.

1 Claim, 5 Drawing Sheets

CORDLESS TELEPHONE SET AND REGISTRATION METHOD THEREFOR

BACKGROUND OF THE INVENTION

1. Field of the Invention

The present invention generally relates to cordless telephone sets, and more particularly relates to a cordless telephone set and a registration method therefor. The cordless telephone set includes a base unit connected to a telephone line and a terminal unit connected by radio to the base unit.

2. Description of the Related Art

Cordless telephone sets including a base unit connected to a telephone line and a terminal unit connected by radio to the base unit are widely used in general households. In such cordless telephone sets, a discrimination code, e.g. a base unit number or a terminal unit number, is set in order to discriminate a relationship between the base unit and terminal unit. Radio connection will be made when the discrimination code registered in the base unit matches that registered in the terminal unit.

When installing an additional terminal unit to the known cordless telephone set, it is required that the terminal unit to be added is not registered to any base unit. When adding a terminal unit which has been registered to a different base unit, the additional installation will not be completed unless the registration data of the terminal unit is deleted beforehand. Often, deletion of the registration data involves a complex operation in order to prevent the data from being deleted by accident.

Also, there has been proposed a cordless telephone set provided with a terminal unit capable of being registered to a plurality of base units. However, it requires a complex operation to register the terminal unit, such as setting the base unit number and the terminal unit number.

When performing additional installation of the terminal unit to the known cordless telephone set, a user must know whether the terminal unit to be added is unregistered. This may cause inconvenience to the user. When the terminal unit to be added has been registered to a different base unit, the user is required to perform additional complex operations to delete the registration contents. This may be burdensome to the user.

When adding the terminal unit that is capable of being registered to a plurality of base units, it is necessary to register the base unit number and the terminal unit number in both the base unit and the terminal unit, imposing a substantial burden on the user.

When the user forgets to register a certain unit and thus the relationships registered in each unit do not coincide with each other, communication between each unit will become confused. However, the known cordless telephone set is not provided with a function for automatically resolving the confused communication.

In the additional installation of the terminal unit or the registration of the terminal unit to a plurality of base units, it is necessary to perform a complex operation in order to activate the terminal unit. It is thus difficult for the user to register the terminal unit. Furthermore, when the user forgets to register a certain unit and thus the registration contents of each unit do not coincide with each other, communication between each unit may become confused. The confused communication will not be resolved until the registration contents are corrected.

SUMMARY OF THE INVENTION

Accordingly, it is an object of the present invention to provide a cordless telephone set in which additional registration of a base unit and/or a terminal unit may be performed with a simple operation, and lines connected to all the registered base units may be used from the terminal unit.

It is another object of the present invention to provide a registration method for a cordless telephone set in which additional registration of a base unit and/or a terminal unit is performed with a simple operation.

In accordance with one aspect of the present invention, there is provided a cordless telephone set including a base unit connected to a telephone line and a terminal unit connected by radio to the base unit. The base unit includes: a terminal-unit detecting unit, which includes a cradle on which the terminal unit is placed, for detecting that the terminal unit is placed on the cradle; a recording unit for recording an identification number unique to the base unit and an identification number unique to the terminal unit having a relationship with the base unit; a communicating unit for communicating data including the identification numbers with the terminal unit by radio; and a control unit for recording the identification number of the terminal unit in the recording unit on condition that the identification number of the terminal unit input by the communicating unit is not in the recording unit. The terminal unit includes: a base-unit detecting unit for detecting that the terminal unit is placed on the cradle of the base unit; a recording unit for recording the identification number of the terminal unit and the identification number of the base unit having a relationship with the terminal unit; a communicating unit for communicating data including the identification numbers with the base unit by radio; and a control unit for recording the identification number of the base unit in the recording unit on condition that the identification number of the base unit input by the communicating unit is not in the recording unit.

In the cordless telephone set described above, the base unit, which has detected by the terminal-unit detecting unit that the terminal unit is placed thereon, awaits the terminal unit identification number to be transmitted from the terminal unit. The terminal unit, which has detected by the base-unit detecting unit that the terminal unit is placed on the base unit, transmits the terminal unit identification number to the base unit by the communicating unit. After receiving the terminal unit identification number by the communicating unit, the base unit checks for the identification number transmitted from the terminal unit by the control unit. When the terminal unit identification number is not on an identification number list of terminal units having a relationship with the base unit, which is recorded in the recording unit, the terminal unit identification number is added to the list, thus updating the list. Next, the base unit transmits the base unit identification number to the terminal unit by the communicating unit. The terminal unit, which has received the identification number of the base unit by the communicating unit, checks for the received identification number of the base unit by the control unit. When the received identification number of the base unit is not on an identification number list of base units having a relationship with the terminal unit, the base unit identification number is added to the list, thus updating the list. Accordingly, the identification number lists of both the base unit and the terminal unit, which are indicative of a relationship between the base unit and the terminal unit, are updated.

Pursuant to another aspect of the features of the present invention, there is provided a cordless telephone set including a base unit connected to a telephone line and a terminal unit connected by radio to the base unit. The base unit includes: a recording unit for recording a terminal unit identification number list, which includes an identification number unique to the terminal unit having a relationship with the base unit and a terminal unit number assigned to the terminal unit, and a base unit number assigned to the base unit; a communicating unit for transmitting data, which include the corresponding terminal unit number and the base unit number of the base unit, to a predetermined terminal unit and communicating with the terminal unit by radio; and a control unit for updating the terminal unit identification number list and the base unit number of the base unit in accordance with the terminal unit number and the base unit number input by the communicating unit and recording the same in the recording unit. The terminal unit includes: a recording unit for recording a base unit identification number list, which includes an identification number unique to the base unit having a relationship with the terminal unit and a base unit number assigned to the base unit, and a terminal unit number assigned to the terminal unit; a communicating unit for transmitting data, which include the corresponding base unit number and the terminal unit number of the terminal unit, to a predetermined base unit and communicating with the base unit by radio; and a control unit for updating the base unit identification number list and the terminal unit number of the terminal unit in accordance with the terminal unit number and the base unit number input by the communicating unit and recording the same in the recording unit. In the cordless telephone set as described above, when the base unit and the terminal unit communicate with each other by radio, a transmitter transmits a receiver's terminal unit number or base unit number and the transmitter's base unit number or terminal unit number, which are recorded in the recording unit of the transmitter, to the receiver by the communicating unit. When the receiver receives the base unit number and the terminal unit number by the communicating unit, the receiver updates, based on the received base unit number and the terminal unit number, the receiver's base unit number or terminal unit number and the terminal unit identification number list or the base unit identification number list by the control unit following a predetermined process.

In accordance with a further aspect of the present invention, there is provided a registration method for a cordless telephone set including a base unit connected to a telephone line and a terminal unit connected by radio to the base unit. The method includes the steps of: activating, by the base unit which has detected that the terminal unit is placed on the base unit, a registration mode in which radio communication from the terminal unit is awaited and registration of the terminal unit is performed; transmitting, by the terminal unit which has detected that the terminal unit is placed on the base unit, an identification number unique to the terminal unit to the base unit by radio; determining, by the base unit which has received the identification number of the terminal unit, whether the received identification number is on a terminal unit identification number list of terminal units having a relationship with the base unit; adding, by the base unit, the received identification number of the terminal unit to the terminal unit identification number list on condition that the received identification number is not on the list, thus updating the list; transmitting, by the base unit, the identification number of the base unit to the terminal unit by radio, thus ending the registration mode; determining, by the terminal unit which has received the identification number of the base unit, whether the received identification number is on a base unit identification number list of base units having a relationship with the terminal unit; and adding, by the terminal unit, the received identification number of the base unit to the base unit identification number list on condition that the received identification number is not on the list, thus updating the list.

In the registration method for the cordless telephone set described above, when the terminal unit is placed on the base unit, both the base unit and the terminal unit detect that the terminal unit is placed on the base unit. The terminal unit transmits its identification number to the base unit by radio. The base unit receives the terminal unit identification number and determines whether the received identification number is on the terminal unit identification number list. If the determination result is negative, the terminal unit identification number is added to the list, thus updating the list of terminal units having a relationship with the base unit. If the determination result is affirmative, the list is not updated. Regardless of the determination result, the base unit transmits its identification number to the terminal unit by radio. The terminal unit receives the base unit identification number and determines whether the received identification number is on the base unit identification number list. If the determination result is negative, the identification number is added to the list, thus updating the list of base units having a relationship with the terminal unit. If the determination result is affirmative, the list is not updated. Accordingly, the identification lists of both the base unit and the terminal unit, which are indicative of a relationship between the base unit and the terminal unit, are updated.

Pursuant to still another aspect of the present invention, there is provided a registration method for a cordless telephone set including a base unit connected to a telephone line and a terminal unit connected by radio to the base unit. The method includes the steps of: recording, by the base unit, a terminal unit identification number list, which includes a terminal unit number of the terminal unit having a relationship with the base unit and an identification number unique to the terminal unit corresponding to the terminal unit number, and a base unit number of the base unit; recording, by the terminal unit, a base unit identification number list, which includes a base unit number of the base unit having a relationship with the terminal unit and an identification number unique to the base unit corresponding to the base unit number, and a terminal unit number of the terminal unit; transmitting, by the base unit, the terminal unit number of the terminal unit recorded on the terminal unit identification number list of the base unit when the base unit communicates with the terminal unit; comparing, by the terminal unit which has received the terminal unit number from the base unit, the terminal unit number recorded in the terminal unit with the received terminal unit number; changing, by the terminal unit, the terminal unit number to the received terminal unit number on condition that the received terminal unit number is greater than the recorded terminal unit number; transmitting, by the terminal unit, the base unit number of the base unit recorded on the base unit identification number list of the terminal unit when the terminal unit communicates with the base unit; comparing, by the base unit which has received the base unit number from the terminal unit, the base unit number recorded in the base unit with the received base unit number; and changing, by the base unit, the base unit number to the received base unit number on condition that the received base unit number is greater than the recorded base unit number.

In the registration method for the cordless telephone set described above, when normal communication is performed from the base unit to the terminal unit, the base unit transmits the terminal unit number, which is in the terminal unit identification number list recorded in the base unit, and the base unit number to the terminal unit. Upon reception of the unit numbers, the terminal unit updates the terminal unit number to the received value if the received terminal unit number is greater than the terminal unit number recorded therein. If the received base unit number is greater than the recorded base unit number, the terminal unit updates the base unit identification number list. Likewise, when communication is performed from the terminal unit to the base unit, the terminal unit transmits the base unit number, which is in the base unit identification number list recorded in the terminal unit, and the terminal unit number to the base unit. Upon reception of the unit numbers, the base unit updates the base unit number to the received value if the received base unit number is greater than the base unit number recorded therein. If the received terminal unit number is greater than the recorded terminal unit number, the base unit updates the terminal unit identification number list.

In the cordless telephone set and the registration method therefor according to the present invention, a user simply needs to place the terminal unit on the cradle of the base unit in order to update the identification number lists of the base unit and the terminal unit, thereby establishing radio communication. In addition, all the base units, each having a relationship with one terminal unit, recognize the terminal unit with the same terminal unit number. Also, all the terminal units, each having a relationship with one base unit, recognize the base unit with the same base unit number. Therefore, even when some units are not registered in the initial registration, communication will not become confused.

DESCRIPTION OF THE PREFERRED EMBODIMENTS

The present invention will be understood from the following description of the preferred embodiments taken in conjunction with the accompanying drawings.

Figure 1:
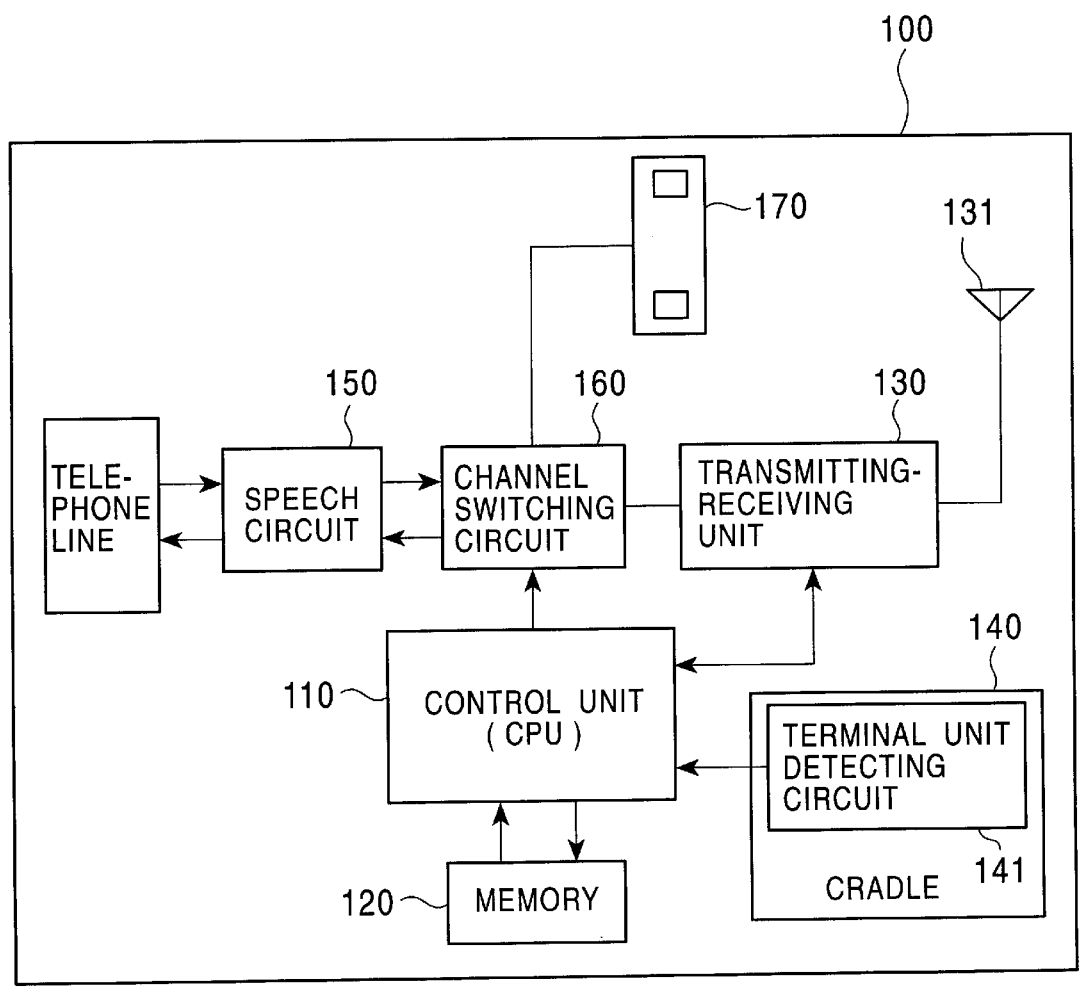
FIG. 1 is a block diagram of a base unit of a cordless telephone set according to an embodiment of the present invention.

FIG. 1 is a block diagram of a base unit of a cordless telephone set according to an embodiment of the present invention.

A base unit 100 of the cordless telephone set includes a control unit (CPU) 110 for performing the overall control of the base unit 100, memory 120, a communication unit including a transmitting-receiving unit 130 and an antenna 131, a terminal-unit detecting unit including a cradle 140 on which a terminal unit is placed and a terminal-unit detecting circuit 141, a speech circuit 150 for connecting to a telephone line, a channel switching circuit 160 for switching channel connection to the speech circuit 150, and a handset 170 that forms a channel to the speech circuit 150.

The control unit (CPU) 110 is connected to the memory 120, the transmitting-receiving unit 130, the terminal-unit detecting circuit 141, and the channel switching circuit 160. The CPU 110 performs overall control of the base unit 100. The CPU 110 reads and writes contents of the memory 120. The memory 120 may be, for example, an E2PROM that stores data substantially permanently. The memory 120 records at least an identification number unique to the base unit 100, a base unit number, and a terminal unit number corresponding to a list of identification numbers of terminal units having a relationship with the base unit 100. The transmitting-receiving unit 130 performs radio communication with the terminal unit via the antenna 131 in accordance with a command from the CPU 110. The cradle 140, on which the terminal unit is placed and thereby charged, is provided with the terminal-unit detecting circuit 141. The terminal-unit detecting circuit 141 may be a charge detecting circuit or any other suitable unit for detecting whether the terminal unit is being charged. The speech circuit 150 forms a speech channel in conjunction with a destination telephone set connected thereto through the telephone line. The speech circuit 150 permits telephonic communication between the channel connected via the channel switching circuit 160 and the destination telephone set. The channel switching circuit 160 selectively switches and connects the speech circuit 150 to the handset 170 or to the transmitting-receiving unit 130. The handset 170 connected to the base unit 100 is brought into connection with the speech circuit 150 when selected by the channel switching circuit 160. A user performs conversation while holding the handset 170 in their hands.

Figure 2:
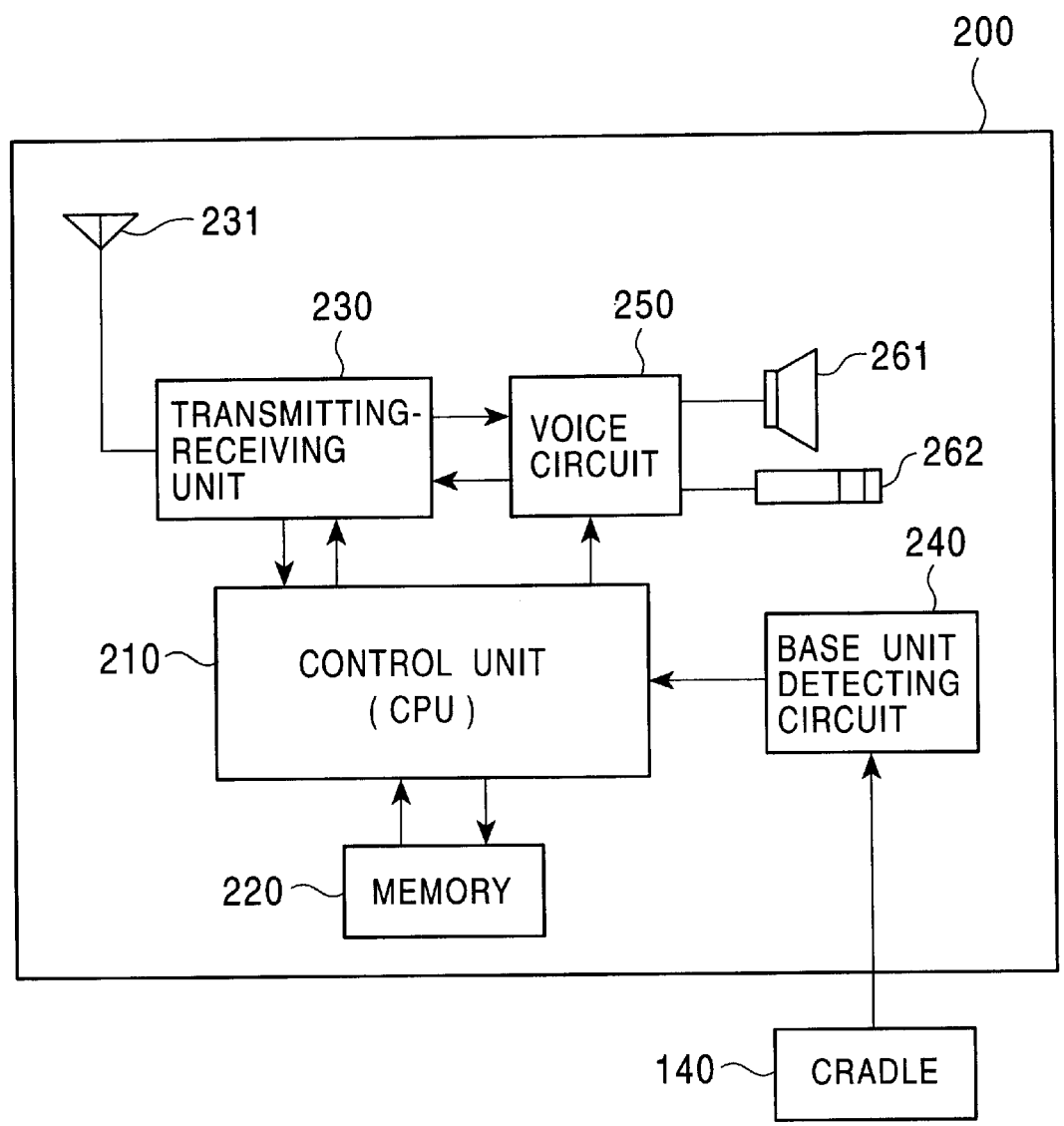
FIG. 2 is a block diagram of a terminal unit of the cordless telephone set according to the embodiment of the present invention.

The terminal unit of the cordless telephone set will be described below. FIG. 2 is a block diagram of the terminal unit of the cordless telephone set according to the embodiment of the present invention.

A terminal unit 200 of the cordless telephone set according to the present invention includes a control unit (CPU) 210 for performing the overall control of the terminal unit 200, memory 220, a communicating unit including a transmitting-receiving unit 230 and an antenna 231, a base-unit detecting circuit 240 for detecting whether the terminal unit 200 is placed on the cradle 140 of the base unit 100, a voice circuit 250 for processing a voice, a speaker 261 for outputting the voice, and a microphone 262 for inputting the voice.

The control unit (CPU) 210 is connected to the memory 220, the transmitting-receiving unit 230, the base-unit detecting circuit 240, and the voice circuit 250. The CPU 210 performs the overall control of the terminal unit 200. The CPU 210 reads and writes contents of the memory 220. The memory 220 may be, for example, an E2PROM that stores data substantially permanently. The memory 220 records at least an identification number unique to the terminal unit 200, a terminal unit number, and a base unit number corresponding to a list of identification numbers of base units having a relationship with the terminal unit 200. The transmitting-receiving unit 230, which is the communicating unit, performs radio communication with the base unit 100 via the antenna 231 in accordance with a command from the CPU 210. The base-unit detecting circuit 240 detects whether the terminal unit 200 is placed on the cradle 140 of the base unit 100. The base-unit detecting circuit 240 may be a charge detecting circuit or any other suitable unit for detecting whether the terminal unit 200 is being charged.

The identification number, the base unit number, and the terminal unit number will be described below.

The identification number is a number unique to each unit, such as a serial number specifying each unit. The base unit number is for discriminating a base unit among a plurality of base units. The terminal unit number is for discriminating a terminal unit among a plurality of terminal units.

The identification number is unique to each unit and is never changed, whereas the base unit number and the terminal unit number are arbitrarily set in accordance with a configuration of the cordless telephone set. In communication between the base unit and the terminal unit, the identification numbers are employed to specify the destination, but the user may not be aware of the identification numbers. In general, the user identifies each base unit by the base unit number and each terminal unit by the terminal unit number.

A cordless telephone set consisting of one base unit and three terminal units is given as an example. The base unit number is set to 1, and terminal unit numbers are set to 1, 2, and 3 respectively. When the terminal units having terminal unit numbers 2 and 3 are re-registered to a different base unit which already has three terminal units, the terminal unit having terminal unit number 2 is changed to a terminal unit number 4. Likewise, the terminal unit having terminal unit number 3 of the original cordless telephone set is changed to a terminal unit number 5.

In operation, when the terminal unit 200 is placed on the cradle 140 of the base unit 100, the base unit 100 and the terminal unit 200 detect that the terminal unit 200 is placed on the base unit 100 by the terminal-unit detecting circuit 141 and the base-unit detecting circuit 240, respectively. When the CPU 110 receives information that the terminal unit 200 is placed on the base unit 100, the base unit 100 enters a state in which radio communication from the terminal unit 200 is awaited for a predetermined period of time. When the CPU 210 receives information that the terminal unit 200 is placed on the base unit 100, the terminal unit 200 transmits its identification number to the base unit 100 via the transmitting-receiving unit 230 and the antenna 231. When the CPU 110 of the base unit 100 receives the identification number of the terminal unit 200, the terminal unit 200 having a relationship with the base unit 100, via the antenna 131 and the transmitting-receiving unit 130, the CPU 110 determines whether the received identification number is on the terminal unit identification number list stored in the memory 120. If the determination result is negative, the CPU 110 adds and registers the received identification number to the list stored in the memory 120, thereby updating the identification number list. The base unit 100 transmits its identification number to the terminal unit 200 via the transmitting-receiving unit 130 and the antenna 131. When the CPU 210 of the terminal unit 200 receives the identification number of the base unit 100, the base unit having a relationship with the terminal unit 200, via the antenna 231 and the transmitting-receiving unit 230, the CPU 210 determines whether the received identification number is on the base unit identification number list stored in the memory 220. If the determination result is negative, the CPU 210 adds and registers the received identification number to the list stored in the memory 220, thereby updating the list. Following a process which will be described below, the transmitting-receiving units 130 and 230 transmit the base unit number and the terminal unit number stored therein to each other, thereby updating the base unit number and the terminal unit number recorded in each memory 120 and 220.

Figure 3:
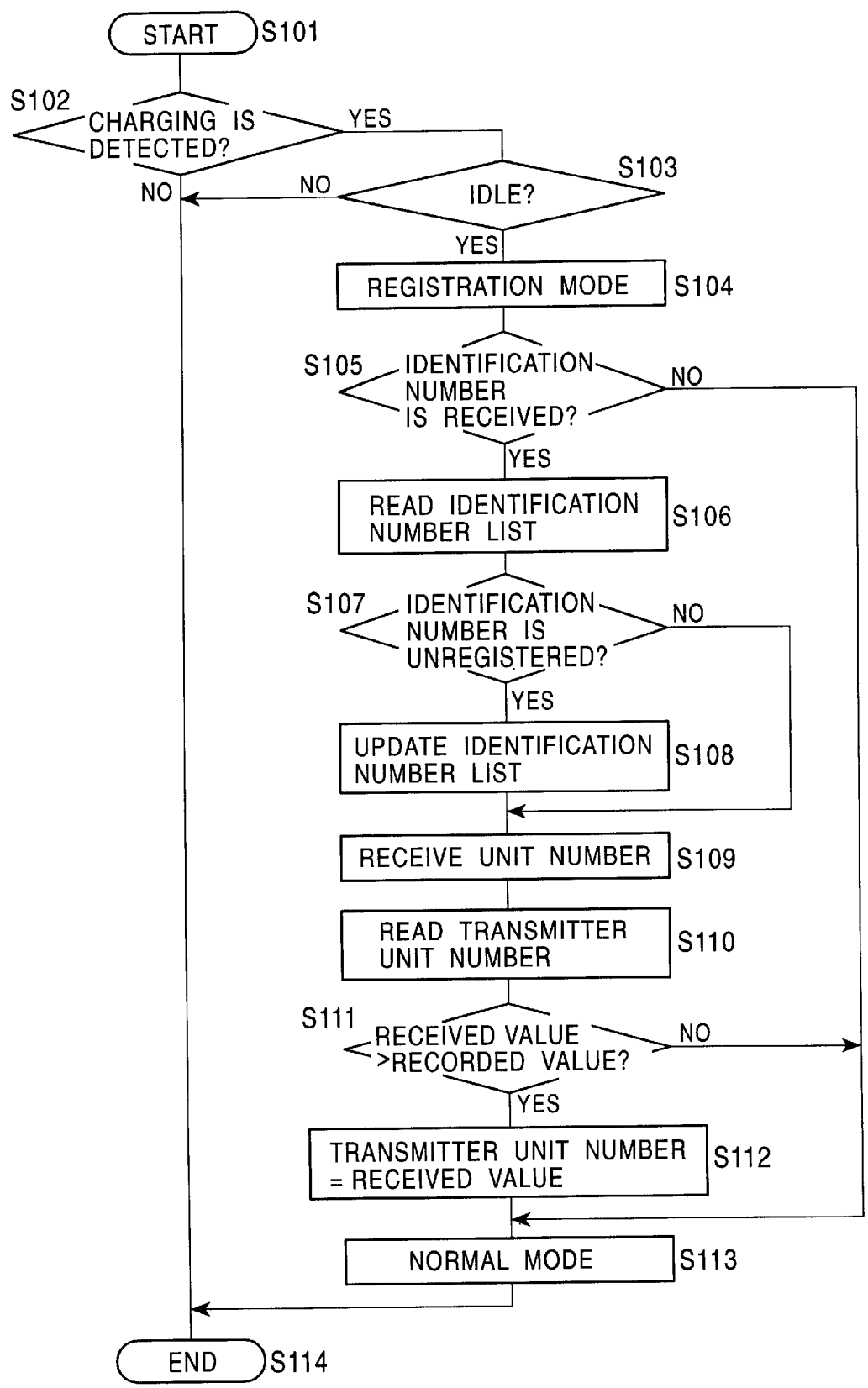
FIG. 3 is a flowchart of a cordless-telephone-set terminal-unit registration method according to an embodiment of the present invention.

A cordless-telephone-set terminal-unit registration method according to the present invention will be described below. In the following description, two cordless telephone sets, each set consisting of a base unit and a terminal unit having a relationship with each other, will be arranged so that each unit is registered to a corresponding unit of the other set. FIG. 3 is a flowchart of a cordless-telephone-set terminal-unit registration method according to an embodiment of the present invention.

A terminal unit of one telephone set is placed on a cradle of a base unit of the other telephone set. First, the base unit will be described below. When the process starts (S101), it is determined whether the terminal unit is placed on the cradle by determining whether the terminal unit is being charged (S102). If the determination result is negative, the process ends (S114), and waits for the next activation. If the determination result is affirmative, that is, if the terminal unit is placed on the cradle, the process determines whether the terminal unit is not connected to the telephone line, i.e., whether it is idle (S103). If the determination result is negative, the process is terminated (S114). If the determination result is affirmative, the process activates a registration mode (S104). In the registration mode, the process waits for transmission of the identification number of the terminal unit for a predetermined period of time (S105). If the process receives no identification number in the predetermined period of time, the process ends the registration mode and returns to the normal mode (S113). If the process receives the identification number, the process reads the identification number list of terminal units having a relationship with the base (S106). The process determines whether the received identification number is unregistered in the list (S107). If the determination result is affirmative, i.e., if the received identification number is unregistered, the list is updated (S108). If the determination result is negative, i.e., if the received identification number is registered, the list will not be updated. The process rearranges the list in ascending order of the terminal unit identification numbers. In accordance with the rearranged list, the process assigns a new terminal unit number to each identification number in the list, from the top of the list to the bottom. Regardless of the updating of the list, the process transmits the identification number of the base unit to the terminal unit (not shown).

Next the terminal unit will be described. The process determines whether the terminal unit is placed on the base unit by determining whether the terminal unit is being charged (S102). If the determination result is negative, the process ends (S114), and waits for the next activation. If the determination result is affirmative, the process determines whether the terminal unit is idle (S103). If the determination result is affirmative, the process activates a registration mode (S104). In the registration mode, the process transmits the identification number of the transmitter to the base unit and waits for the identification number of the base unit to be transmitted for a predetermined period of time (S105). If the process receives no identification number, the process ends the registration mode and returns to the normal mode (S113). If the process receives the identification number, the process reads the identification number list of base units having a relationship with the terminal unit (S106). The process determines whether the received identification number is unregistered in the list (S107). If the determination result is affirmative, the list is updated (S108). If the determination result is negative, the list will not be updated. The process rearranges the list in ascending order of the base unit identification numbers. In accordance with the rearranged list, the process assigns a new base unit number to each identification number in the list, from the top of the list to the bottom. Specifically, the terminal unit having received the identification number of the base unit performs the steps from S106 to S108 in a manner similar to the base unit.

By this time, each of the base unit and the terminal unit has updated the identification number list of receivers having a relationship with the transmitter.

The terminal unit transmits a new base unit number to the base unit, which has been determined in accordance with the order of the updated base unit identification number list (not shown).

Next, the processing steps of the base unit, after receiving its unit number, i.e. the base unit number, will be described. The base unit receives the base unit number transmitted from the terminal unit (S109). The base unit reads its unit number, i.e. the base unit number, which is recorded therein (S110), and compares the recorded base unit number with the received base unit number (S111). If the received base unit number is greater than the recorded base unit number, the base unit number is updated to the received base unit number (S112). If not, the base unit number will not be updated. The base unit transmits the terminal unit number, which has been computed from the updated terminal unit identification number list, to the terminal unit. The base unit returns to the normal mode (S113) and ends the process (S114).

Next, the processing steps of the terminal unit, after receiving its unit number, i.e. the terminal unit number, will be described. The terminal unit receives its unit number, i.e. the terminal unit number, computed by the transmitter, i.e. the base unit (S109). The terminal unit reads out the terminal unit number recorded therein (S110) and compares the recorded terminal unit number with the received terminal unit number (S111). If the received terminal unit number is greater than the recorded terminal unit number, the terminal unit number is updated to the received terminal unit number (S112). If not, the recorded terminal unit number will not be updated. The terminal unit returns to the normal mode (S113) and ends the process (S114).

Similarly, the terminal unit of the other telephone set of the two sets, each set consisting of the base unit and the terminal unit, is placed on the cradle of the base unit of the telephone set different from the former set. The same process is repeated for the base unit and the terminal unit.

Accordingly, all the base units, each having a relationship with one terminal unit, recognize the terminal unit with the same unit number. Also, all the terminal units, each having a relationship with one base unit, recognize the base unit with the same base unit number.

Figure 4:
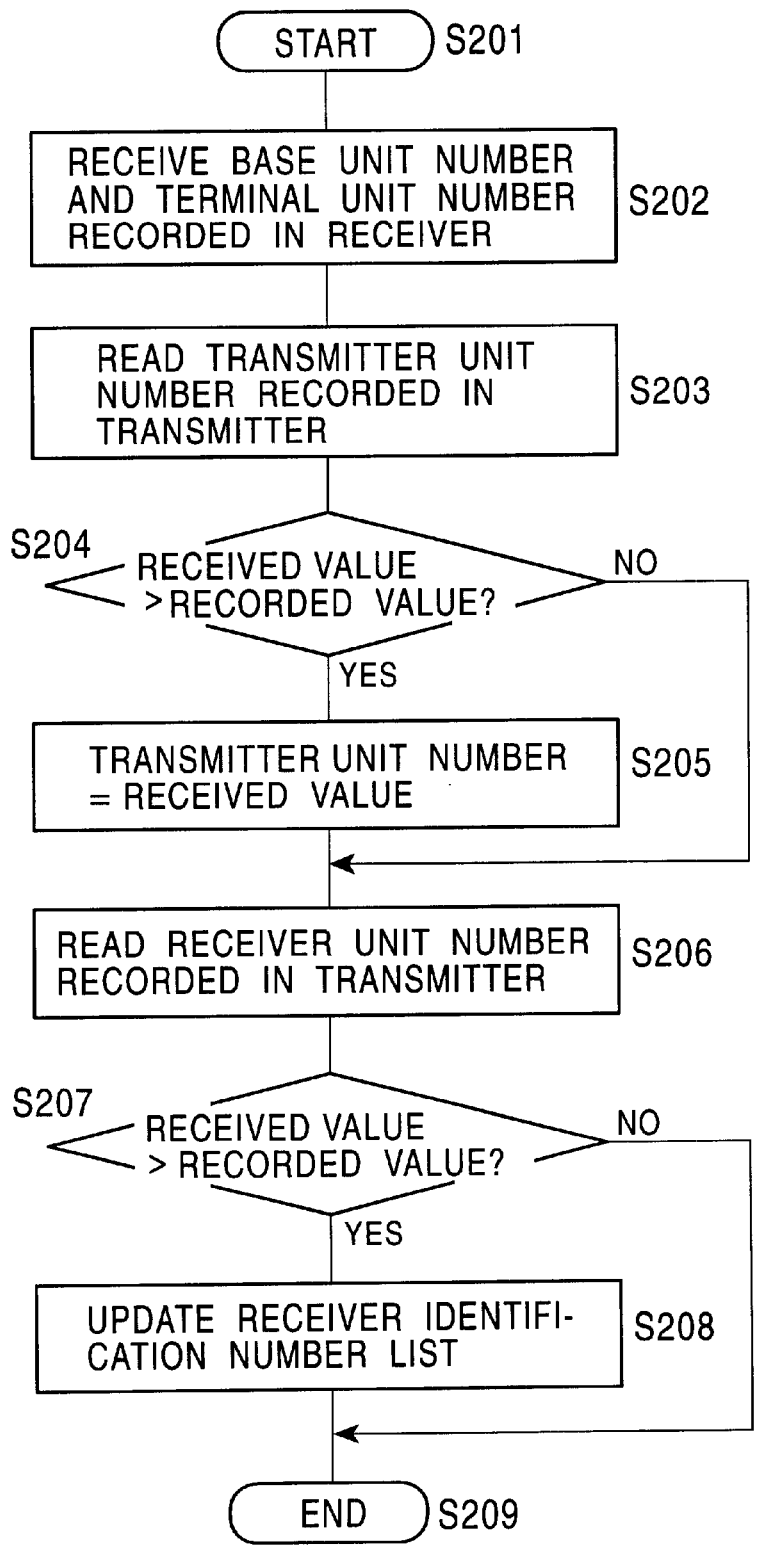
FIG. 4 is a flowchart of a cordless-telephone-set unit-number updating method according to an embodiment of the present invention.

Next, processing of the cordless telephone set according to the embodiment of the present invention in normal communication will be described. FIG. 4 is a flowchart of a cordless-telephone-set unit-number updating method according to an embodiment of the present invention. Normally, the base unit and the terminal unit communicate with each other by radio using the identification numbers when terminating or originating a call. Simultaneously, each of the base unit and the terminal unit transmits, to the receiver, the unit number of the transmitter (the base unit number or the terminal unit number) recorded in the memory of the transmitter and the unit number of the receiver (the base unit number or the terminal unit number) read from the receiver identification number list recorded in the memory of the transmitter.

To put it simply, it is assumed that the transmitter is the base unit in the following description. However, the same process is performed even if the transmitter is the terminal unit. When the process starts (S201), it receives the terminal unit number (the transmitter unit number when the terminal unit is the transmitter) and the base unit number (the receiver unit number when the terminal unit is the transmitter) recorded in the terminal unit by radio (S202). The process reads out the base unit number (the transmitter unit number) recorded in the transmitter (S203) and compares the recorded unit number with the received unit number from the terminal unit (S204). If the received unit number is greater than the recorded unit number, the transmitter unit number is updated to the received unit number (S205). If not, the base unit number of the transmitter will not be updated. Next, the process reads out the terminal unit number of the terminal unit (the receiver unit number) determined from the list of identification numbers of the terminal units recorded in the transmitter (S206). The process compares the recorded terminal unit number with the received terminal unit number (the receiver unit number) from the terminal unit (S207). If the received terminal unit number (the receiver unit number) is greater than the recorded unit number, the process updates the list so that the identification numbers on the list subsequent to the received identification number (including the received identification number) are shifted backward. Finally, the process ends (S209). If the process is performed for the terminal unit, the receiver unit number will be the base unit number and the transmitter unit number will be the terminal unit number in the above description.

Figure 5:
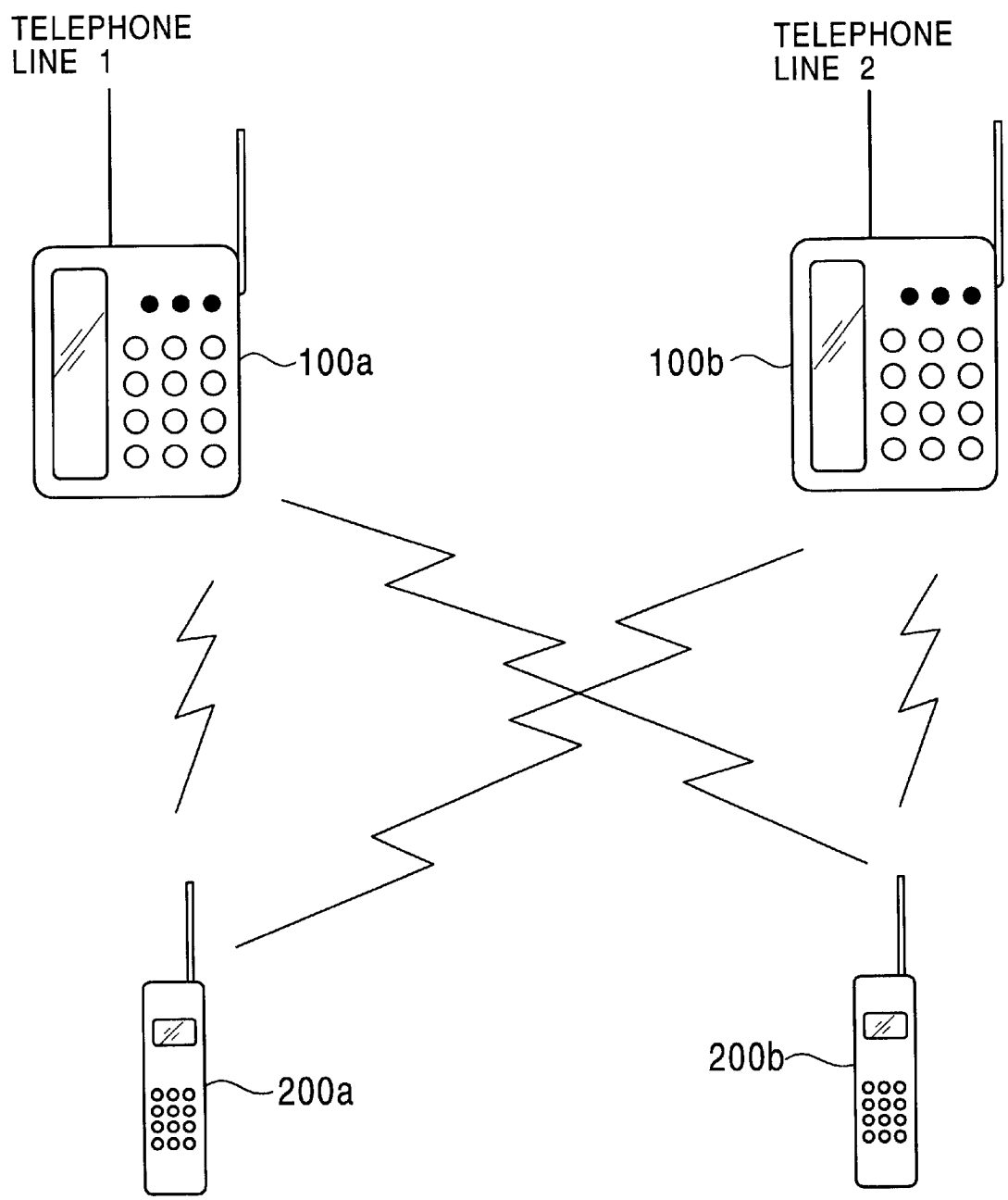
FIG. 5 illustrates a system configuration of the cordless telephone according to the embodiment of the present invention.

Accordingly, even when some units are not registered in the initial registration, communication will not become confused. Following the above process for updating the unit number of the transmitter, an example employing actual units will be described below. Referring to FIG. 5, a system configuration of the cordless telephone set according to the embodiment of the present invention is illustrated. A base unit 100a is connected to a telephone line 1 and has a relationship with a terminal unit 200a. A base unit 100b is connected to a telephone line 2 and has a relationship with a terminal unit 200b. In each unit, unit numbers of the receiver and the transmitter are set to 1. It is assumed that an identification number of the base unit 100b is greater than that of the base unit 100a, and an identification number of the terminal unit 200b is greater than that of the terminal unit 200a. In the following description, the original settings will be changed to generate new relationships among the units, i.e. between the base unit 100b and the terminal unit 200a and between the base unit 100a and the terminal unit 200b. By placing the terminal unit 200a on a cradle of the base unit 100b, the base unit 100b recognizes that the terminal unit 200a is a terminal unit 1 and the terminal unit 200b is a terminal unit 2. The terminal unit 200a recognizes that the base unit 100a is a base unit 1 and the base unit 100b is a base unit 2.

It is now assumed that, although the terminal unit 200b was placed on the base unit 100a, the setting was not changed. When the base unit 100b communicates to the terminal unit 200b, the terminal unit 200b recognizes that its terminal unit number has been changed to terminal unit number 2 and the base unit number of the base unit 100b has been changed to base unit number 2. The terminal unit 200b thus updates its terminal unit number and the base unit identification number list. Accordingly, the base unit number and the terminal unit number are corrected automatically, and hence the communication will not become confused.

The processing functions described above can be realized using a computer. In that case, the processing contents of the functions that the cordless telephone set must have are written in a computer program recorded in a computer-readable recording medium. Execution of the program enables the computer to perform the above process. The computer-readable recording medium may include a magnetic recording medium or a semiconductor memory. To distribute the program, the program may be stored in a portable recording medium, such as a CD-ROM (Compact Disk Read Only Memory) or a floppy disk. The program may be stored in the memory of a computer connected through the network to a different computer, so that the program is forwarded through the network to the different computer. In order that the computer executes the program, the program is stored in the hard disk drive or any other suitable unit in the computer and is loaded into the main memory to execute the program.

What is claimed is:

1. A registration method for a cordless telephone set comprising a base unit connected to a telephone line and a terminal unit connected by radio to said base unit, comprising the steps of:

recording, by said base unit, a terminal unit identification number list, which includes a first terminal unit number of said terminal unit having a terminal relationship with said base unit and a terminal unit identification number unique to said terminal unit corresponding to the first terminal unit number, and a first base unit number of said base unit;

recording, by said terminal unit, a base unit identification number list, which includes a second base unit number of said base unit having a base relationship with said terminal unit and a base unit identification number unique to said base unit corresponding to the second base unit number, and a second terminal unit number of said terminal unit;

transmitting, by said base unit, the first terminal unit number and the first base unit number when said base unit communicates with said terminal unit;

comparing, by said terminal unit which has received the first terminal unit number from said base unit, the second terminal unit number with the first terminal unit number;

changing, by said terminal unit, the second terminal unit number to the first terminal unit number when the first terminal unit number is greater than the second terminal unit number;

comparing, by said terminal unit, the first base unit number with the second base unit number;

updating, by said terminal unit, the base unit identification number list in accordance with the first base unit number when the first base unit number is greater than the second base unit number;

transmitting, by said terminal unit, the second base unit number and the second terminal unit number when said terminal unit communicates with said base unit;

comparing, by said base unit which has received the second base unit number from said terminal unit, the first base unit number with the second base unit number;

changing, by said base unit, the first base unit number to the second base unit number when the second base unit number is greater than the first base unit number;

comparing, by said base unit, the second terminal unit number with the first terminal number; and updating, by said base unit, the terminal unit identification number list in accordance with the second terminal unit number when the second terminal unit number is greater than the first terminal unit number.

* * * * *